US009505872B2

(12) United States Patent
Ryu et al.

(10) Patent No.: US 9,505,872 B2
(45) Date of Patent: Nov. 29, 2016

(54) POLYMERIZABLE COMPOSITION FOR OPTICAL MATERIAL, OPTICAL MATERIAL AND METHOD FOR PRODUCING OPTICAL MATERIAL

(75) Inventors: Akinori Ryu, Arao (JP); Seiichi Kobayashi, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 12/863,790

(22) PCT Filed: Feb. 6, 2009

(86) PCT No.: PCT/JP2009/000454
§ 371 (c)(1),
(2), (4) Date: Jul. 21, 2010

(87) PCT Pub. No.: WO2009/098887
PCT Pub. Date: Aug. 13, 2009

(65) Prior Publication Data
US 2010/0292430 A1    Nov. 18, 2010

(30) Foreign Application Priority Data
Feb. 7, 2008   (JP) ................. 2008-027935

(51) Int. Cl.
*C08G 18/38* (2006.01)
*G02B 1/04* (2006.01)
*C08G 18/72* (2006.01)
*C08G 18/73* (2006.01)
*C08G 18/76* (2006.01)

(52) U.S. Cl.
CPC ......... *C08G 18/3876* (2013.01); *C08G 18/724* (2013.01); *G02B 1/041* (2013.01); *C08G 18/73* (2013.01); *C08G 18/7621* (2013.01)

(58) Field of Classification Search
None
See application file for complete search history.

(56) References Cited

U.S. PATENT DOCUMENTS

| 3,132,976 | A | * | 5/1964 | Klager et al. ............... 149/19.4 |
| 3,517,002 | A | * | 6/1970 | Heiss ........................... 544/222 |
| 3,600,359 | A | * | 8/1971 | Miranda ....................... 558/240 |
| 4,465,755 | A | * | 8/1984 | Kiritani et al. ............ 430/110.2 |
| 5,087,758 | A | | 2/1992 | Kanemura et al. |
| 5,191,055 | A | | 3/1993 | Kanemura et al. |
| 5,298,431 | A | * | 3/1994 | Goldstein et al. ............ 528/491 |
| 5,576,412 | A | | 11/1996 | Hirata et al. |
| 5,594,088 | A | | 1/1997 | Nagata et al. |
| 5,753,730 | A | | 5/1998 | Nagata et al. |
| 6,441,119 | B1 | | 8/2002 | Kosaka |
| 6,448,304 | B1 | | 9/2002 | Kosaka et al. |
| 6,887,401 | B2 | * | 5/2005 | Keita et al. ................... 264/1.1 |
| 2002/0132954 | A1 | | 9/2002 | Kosaka |
| 2003/0125410 | A1 | | 7/2003 | Keita et al. |
| 2004/0026658 | A1 | * | 2/2004 | Yoshimura et al. ...... 252/183.11 |
| 2004/0141230 | A1 | | 7/2004 | Kosaka |
| 2010/0075154 | A1 | | 3/2010 | Hayashi et al. |

FOREIGN PATENT DOCUMENTS

| CN | 1405198 A | 3/2003 |
| CN | 1599763 A | 3/2005 |
| EP | 1138670 B1 | 5/2005 |
| JP | 62-267316 A | 11/1987 |
| JP | 64-045611 A | 2/1989 |
| JP | 1-311118 A | 12/1989 |
| JP | 2-270859 A | 11/1990 |
| JP | 5-273401 A | 10/1993 |
| JP | 11-322930 A | 11/1999 |
| JP | 2001-091906 A | 4/2001 |
| JP | 2001-091907 A | 4/2001 |
| JP | 2001-091908 A | 4/2001 |
| JP | 2002-082203 A | 3/2002 |
| JP | 2003-026753 A | 1/2003 |
| JP | 2006-001982 A | 1/2006 |
| JP | 2006-003624 A | 1/2006 |
| JP | 2008-015465 A | 1/2008 |
| JP | 2008-255221 A | 10/2008 |
| KR | 10-2004-0063136 A | 7/2004 |
| WO | WO 01/36506 A1 | 5/2001 |
| WO | WO 03/040205 A1 | 5/2003 |

OTHER PUBLICATIONS

Coatings formulation: an international textbook, Bodo Müller and Urlich Poth, Vincentz Network GmbH & Co KG, 2006, pp. 99.*
Paint and coating testing manual: fourteenth edition of the Gardner-Sward handbook, J. V. Koleske, ASTM International, 1995, pp. 90.*
International Search Report of Application No. PCT/JP2009/000454 dated Apr. 28, 2009.
Korean Office Action dated Apr. 22, 2010.
Office Action from Korean Patent Office issued in Applicant's corresponding Korean Patent Application No. 10-2009-7026880 dated Aug. 2, 2010.

(Continued)

*Primary Examiner* — Richard A Huhn
(74) *Attorney, Agent, or Firm* — Buchanan, Ingersoll & Rooney PC

(57) ABSTRACT

A polymerizable composition for an optical material containing tolylene diisocyanate, hexamethylene diisocyanate, and one or more polythiol compounds selected from the group consisting of 4-mercaptomethyl-1,8-dimercapto-3,6-dithiaoctane, 4,8-, 4,7- or 5,7-dimercaptomethyl-1,11-dimercapto-3,6,9-trithiaundecane, pentaerythritol tetrakismercaptoacetate, pentaerythritol tetrakismercaptopropionate, 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithietane.

5 Claims, No Drawings

(56) References Cited

OTHER PUBLICATIONS

International Search Report(Form PCT/ISA/210) issued in related PCT Application No. PCT/JP2009/003707 dated Oct. 27, 2009.

Office Action issued in corresponding Chinese Application on Feb. 4, 2015 (6 pages).

Office Action (First Examination Report) dated Jun. 17, 2014, issued in corresponding India Application No. 5448/DELNP/2010.

* cited by examiner

POLYMERIZABLE COMPOSITION FOR OPTICAL MATERIAL, OPTICAL MATERIAL AND METHOD FOR PRODUCING OPTICAL MATERIAL

TECHNICAL FIELD

The present invention relates to a polymerizable composition for an optical material. Particularly, the invention relates to a polymerizable composition for an optical material containing a specific polyisocyanate compound and a specific polythiol compound. In addition, the invention relates to an optical material obtained from the polymerizable composition for an optical material and a method for producing the optical material.

BACKGROUND ART

From the past, a plastic material has been used as an alternative to an inorganic material for the application to an optical component. Since such a plastic material can be tinted, and is lightweight and hardly broken as compared to an inorganic material which has been used, the plastic material has been suitably used. In particular, as an optical component such as a lens or the like, a plastic material having a high refractive index has been required. As such a plastic material having a high refractive index, there has been proposed a sulfur-containing urethane (thiourethane) based resin as described, for example, in Patent Documents 1 and 2.

Patent Document 1: Japanese Patent Laid-open No. 1990-270859

Patent Document 2: Chinese Patent Laid-open No. 1405198

DISCLOSURE OF THE INVENTION

By the way, in conventional techniques, an aromatic thiourethane based resin whose practical application was difficult from the viewpoint of color has also been used in practice by the development of an additive such as a bluing agent or the like, even though it has a high refractive index. On the other hand, in late years, use of a plastic material has been demanded also for the optical component in the applications where high durability is required. Among such plastic materials, there has been required a material having optical properties, particularly a property of little time-dependent variation in color, that is, high light resistance.

On the other hand, most of plastic materials having a high refractive index are highly viscous, which is insufficient for the application to an optical component requiring high handling properties, so that improvement of handling properties has also been required.

The present inventors have found that there is obtained a material having a high refractive index and high light resistance, without increasing the viscosity from the viewpoint of handling properties by using polyisocyanate composed of a specific isocyanate compound and a specific polythiol compound in combination. Thus, the present invention has been completed.

That is, the present invention is specified by matters described in below:

(1) A polymerizable composition for an optical material containing tolylene diisocyanate, hexamethylene diisocyanate, and one or more polythiol compounds selected from the group consisting of 4-mercaptomethyl-1,8-dimercapto-3,6-dithiaoctane,4,8-, 4,7- or 5,7-dimercaptomethyl-1,11-dimercapto-3,6,9-trithiaundecane, pentaerythritol tetrakismercaptoacetate, pentaerythritol tetrakismercaptopropionate, 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithietane;

(2) An optical material obtained by curing the polymerizable composition for an optical material as set forth in (1);

(3) A method for producing an optical material obtained by curing the polymerizable composition for an optical material as set forth in (1) or (2); and (4) The method for producing an optical material as set forth in (3), in which the aforementioned polymerizable composition for an optical material is formed by casting polymerization.

According to the present invention, it is possible to provide a polymerizable composition for an optical material having a high refractive index, high light resistance and high handling properties, and an optical material obtained from the polymerizable composition.

BEST MODE FOR CARRYING OUT THE INVENTION

Hereinafter, embodiments of the present invention will be described.

The polymerizable composition for an optical material of the present embodiment contains tolylene diisocyanate, hexamethylene diisocyanate, and one or more polythiol compounds selected from the group consisting of 4-mercaptomethyl-1,8-dimercapto-3,6-dithiaoctane,4,8-, 4,7- or 5,7-dimercaptomethyl-1,11-dimercapto-3,6,9-trithiaundecane, pentaerythritol tetrakismercaptoacetate, pentaerythritol tetrakismercaptopropionate, 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithietane.

Furthermore, in addition to tolylene diisocyanate and hexamethylene diisocyanate, other isocyanate compounds may also be used as follows. Examples thereof include aliphatic polyisocyanate compounds such as 2,2,4-trimethylhexamethylene diisocyanate, 2,4,4-trimethylhexamethylene diisocyanate, lysine diisocyanatomethyl ester, lysine triisocyanate, m-xylylene diisocyanate,α,α,α',α'-tetramethylxylylene diisocyanate, bis(isocyanatomethyl)naphthalene, mesitylylene triisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, bis(isocyanatomethylthio)ethane and the like;

alicyclic polyisocyanate compounds such as isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane and the like;

aromatic polyisocyanate compounds such as 4,4'-diphenylmethane diisocyanate, diphenylsulfide-4,4-diisocyanate and the like; and heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane and the like, but are not restricted to these exemplified compounds alone.

Furthermore, examples of the isocyanate compound include polyisocyanate compounds having an isocyanate group mentioned above which is partially substituted with an isothiocyanate group, but are not restricted to these compounds.

Examples of such an isothiocyanate compound include aliphatic polyisothiocyanate compounds such as hexamethylene diisothiocyanate, lysine diisothiocyanatomethyl ester, lysine triisothiocyanate, m-xylylene diisothiocyanate, bis(isothiocyanatomethyl)sulfide, bis(isothiocyanatoethyl)sulfide, bis(isothiocyanatoethyl)disulfide and the like;

alicyclic polyisothiocyanate compounds such as isophorone diisothiocyanate, bis(isothiocyanatomethyl)cyclohexane, dicyclohexylmethane diisothiocyanate, cyclohexane diisothiocyanate, methylcyclohexane diisothiocyanate, 2,5-bis(isothiocyanatomethyl)bicyclo-[2.2.1]-heptane, 2,6-bis(isothiocyanatomethyl)bicyclo-[2.2.1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, 4,9-bis(isothiocyanatomethyl)tricyclodecane and the like;

aromatic polyisothiocyanate compounds such as tolylene diisothiocyanate, 4,4-diphenylmethane diisothiocyanate, diphenyldisulfide-4,4-diisothiocyanate and the like; and sulfur-containing heterocyclic polyisothiocyanate compounds such as 2,5-diisothiocyanatothiophene, 2,5-bis(isothiocyanatomethyl)thiophene, 2,5-isothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, 4,5-bis(isothiocyanatomethyl)-1,3-dithiolane and the like, but are not restricted to these exemplified compounds alone.

Furthermore, the above isocyanate compounds substituted with halogen such as chlorine, bromine and the like, with an alkyl group, an alkoxy group, a nitro group, or modified with polyhydric alcohol prepolymer, carbodiimide, urea, biuret, or a dimerization reaction product of the isocyanate compounds may also be used. Such isocyanate compounds may be used singly, or two or more compounds may be used in combination.

In addition to the aforementioned polythiol compounds, other thiol compounds may be used as follows, and examples thereof include 2-mercaptoethanol, 3-mercapto-1, 2-propanediol, glycerine bis(mercaptoacetate), 4-mercaptophenol, 2,3-dimercapto-1-propanol, pentaerythritol tris(3-mercaptopropionate), pentaerythritol tris(thioglycolate) and the like, but are not restricted to these exemplified compounds alone.

Furthermore, other polythiol compounds may also be used as follows, and examples thereof include aliphatic polythiol compounds such as methanedithiol, 1,2-ethanedithiol, 1,2,3-propanetrithiol, 1,2-cyclohexanedithiol, bis(2-mercaptoethyl)ether, tetrakis(mercaptomethyl)methane, diethyleneglycol bis(2-mercaptoacetate), diethyleneglycol bis(3-mercaptopropionate), ethyleneglycol bis(2-mercaptoacetate), ethyleneglycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), bis(mercaptomethyl)sulfide, bis(mercaptomethyl)disulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, 2,5-dimercaptomethyl-2,5-dimethyl-1,4-dithiane and their esters with thioglycolic acid and mercaptopropionic acid, hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethyl ester), thiodipropionic acid bis(2-mercaptoethyl ester), dithiodiglycolic acid bis(2-mercaptoethyl ester), dithiodipropionic acid bis(2-mercaptoethyl ester), 1,1,3,3-tetrakis(mercaptomethylthio)propane, 1,1,2,2-tetrakis(mercaptomethylthio)ethane, 4,6-bis(mercaptomethylthio)-1,3-dithiacyclohexane, tris(mercaptomethylthio)methane, tris(mercaptoethylthio)methane and the like;

aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluenedithiol, 3,4-toluenedithiol, 1,5-naphthalenedithiol, 2,6-naphthalenedithiol and the like; and heterocyclic polythiol compounds such as 2-methylamino-4,6-dithiol-sym-triazine, 3,4-thiophenedithiol, bismuthiol, 4,6-bis(mercaptomethylthio)-1,3-dithiane, 2-(2,2-bis(mercaptomethylthio)ethyl)-1,3-dithietane and the like, but are not restricted to these exemplified compounds alone.

Furthermore, an oligomer of the above polythiol compounds, other thiol compounds or other polythiol compounds, or those substituted with halogen such as chlorine, bromine and the like may be used as other thiol compounds or other polythiol compounds. These active hydrogen compounds may be used singly, or two or more compounds may be used in combination.

Meanwhile, tolylene diisocyanate, hexamethylene diisocyanate and, as necessary, other isocyanate compounds (hereinafter referred to as the isocyanate compound) used in the present embodiment may be preliminarily reacted in advance with a part of the polythiol compound, and, as necessary, other thiol compounds and other polythiol compounds (hereinafter referred to as the thiol compound). In addition, the thiol compound used in the present invention may be preliminarily reacted in advance with a part of the isocyanate compound.

Furthermore, for the purpose of modifying the resin, a resin modifier such as a hydroxy compound, an epoxy compound, an episulfide compound, an organic acid and its anhydride, an olefinic compound such as a (meth)acrylate compound or the like may be added. Herein, the resin modifier is a compound which improves physical properties such as refractive index, Abbe's number, heat resistance, specific gravity and the like, and mechanical strength such as impact strength of a thiourethane based resin.

Examples of the hydroxy compound used as the resin modifier include diethylene glycol, triethylene glycol, dipropylene glycol, tripropylene glycol, 1,4-butanediol, thiodiethanol, dithiodiethanol, glycerine, trimethylolpropane, pentaerythritol, and an oligomer of these compounds, but are not restricted to these exemplified compounds alone.

Examples of the epoxy compound which may be added as the resin modifier include a phenol-based epoxy compound obtained by condensation reaction of a polyhydric phenol compound such as bisphenol A glycidyl ether and the like with an epihalohydrin compound; an alcohol-based epoxy compound obtained by condensation reaction of a polyhydric alcohol compound such as hydrogenated bisphenol A glycidyl ether and the like with an epihalohydrin compound; a glycidyl ester-based epoxy compound obtained by condensation reaction of a multivalent organic acid compound such as 3,4-epoxycyclohexylmethyl-3',4'-epoxycyclohexane carboxylate and the like with an epihalohydrin compound; an amine-based epoxy compound obtained by condensation reaction of a primary or secondary diamine compound with an epihalohydrin compound; an aliphatic multivalent epoxy compound such as vinylcyclohexene diepoxide and the like, but are not restricted to these exemplified compounds alone.

Examples of the episulfide compound which may be added as the resin modifier include linear aliphatic 2,3-epithiopropylthio compounds such as bis(2,3-epithiopropylthio)sulfide, bis(2,3-epithiopropylthio)disulfide, bis(2,3-epithiopropylthio)methane, 1,2-bis(2,3-epithiopropylthio)ethane, 1,5-bis(2,3-epithiopropylthio)-3-thiapentane and the like;

2,3-epithiopropylthio compound having an alicyclic or heterocyclic ring such as 1,3-bis(2,3-epithiopropylthio)cyclohexane, 2,5-bis(2,3-epithiopropylthiomethyl)-1,4-dithiane and the like; and aromatic 2,3-epithiopropylthio compounds such as 1,3-bis(2,3-epithiopropylthio)benzene, 1,4-bis(2,3-epithiopropylthio)benzene and the like, but are not restricted to these exemplified compounds alone.

Examples of the organic acid and its anhydride which may be added as the resin modifier include thiodiglycolic acid, thiodipropionic acid, dithiodipropionic acid, phthalic anhydride, hexahydrophthalic anhydride, methylhexahydrophthalic anhydride, methyltetrahydrophthalic anhydride, maleic anhydride, trimellitic anhydride, pyromellitic dianhydride and the like, but are not restricted to these exemplified compounds alone.

Examples of the olefinic compound which may be added as the resin modifier include (meth)acrylate compounds such as benzyl acrylate, benzyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, neopentylglycol diacrylate, neopentylglycol dimethacrylate, ethyleneglycol bisglycidyl acrylate, ethyleneglycol bisglycidyl methacrylate, bisphenol A diacrylate, bisphenol A dimethacrylate, bisphenol F diacrylate, bisphenol F dimethacrylate, trimethylolpropane triacrylate, trimethylolpropane trimethacrylate, glycerol diacrylate, glycerol dimethacrylate, pentaerythritol triacrylate, pentaerythritol tetracrylate, pentaerythritol tetramethacrylate, xylylenedithiol diacrylate, xylylenedithiol dimethacrylate, diacrylate, mercaptoethylsulfide dimethacrylate and the like;

allyl compounds such as allylglycidyl ether, diallylphthalate, diallylterephthalate, diallylisophthalate, diethyleneglycol bisallylcarbonate and the like; and vinyl compounds such as styrene, chlorostyrene, methylstyrene, bromostyrene, dibromostyrene, divinylbenzene, 3,9-divinylspirobi(m-dioxane) and the like, but are not restricted to these exemplified compounds alone.

These resin modifiers may be used singly, or two or more compounds may be used in combination.

When the isocyanate compound, the thiol compound and the resin modifier used in the present invention are used, the proportion of the hydroxy compound (hereinafter referred to as the active hydrogen compound) in terms of the molar ratio of functional groups (NCO+NCS)/(SH+OH) is usually in the range of 0.8 to 1.5 and preferably in the range of 0.9 to 1.2.

As described above, the composition containing tolylene diisocyanate, hexamethylene diisocyanate, and a specific polythiol compound as essential components exhibits the viscosity which does not deteriorate handling properties. The viscosity mentioned herein can be evaluated by the viscosity of a monomer mixture measured, for example, using a B type viscometer at 20 degrees centigrade. The viscosity between the viscosity measured immediately after mixing of the composition and the viscosity measured until the completion of injection of all monomers through the degassing process under a reduced pressure or other steps is important. So, from the viewpoint of excellent handling properties, for example, the viscosity immediately after mixing of the composition as a target is not more than 100 mPa·s, preferably not more than 50 mPa·s, and further preferably not more than 30 mPa·s. Furthermore, when the optical material is used for casting polymerization to be described below, the viscosity during injection is preferably not more than 200 mPa·s measured at a temperature of 20 degrees centigrade. In particular, for producing a lens with very thin center thickness, further lower viscosity such as 100 mPa·s or less is more preferable.

Also, the present invention provides an optical material obtained by curing the polymerizable composition for an optical material mentioned above.

Such an optical material is excellent in durability from the viewpoint of little time-dependent variation in color by irradiation with a light. The color mentioned herein can be evaluated by a measurement value of the change (hereinafter referred to as ΔYI) in yellowness index (hereinafter referred to as YI) measured by a QUV testing machine after, for example, irradiation with a light for 48 hours. It is preferable that the ΔYI value of an optical material is as small as possible from the viewpoint of excellent durability.

The refractive index of the optical material mentioned herein may be adjusted by the kind and the composition ratio of the isocyanate compound and the active hydrogen compound in the polymerizable composition as desired. In particular, the refractive index of the optical material of the present embodiment needs to be high. From this viewpoint, preferably used is a combination of an isocyanate compound and an active hydrogen compound, or its composition ratio for obtaining a resin having a refractive index of normally not less than 1.55, preferably not less than 1.59 and further preferably not less than 1.65 when the refractive index is measured by an e-line.

Meanwhile, from another viewpoint, the present invention provides a method for producing an optical material obtained by curing the polymerizable composition, for example, a method for producing an optical material obtained by molding the aforementioned polymerizable composition using a lens casting mold by casting polymerization.

When curing and molding a mixture of the isocyanate compound and the active hydrogen compound, that is, the aforementioned polymerizable composition for an optical material, a substance may be added in the same manner as in a known molding method as necessary. Examples of the substance include a catalyst such as dibutyltin dichloride or the like, an ultraviolet absorber such as a benzotriazole ultraviolet absorber or the like, an internal release agent such as acid phosphate ester or the like, a light stabilizer, an anti-oxidant, a reaction initiator such as a radical reaction initiator or the like, a chain extension agent, a crosslinking agent, an anti-coloring agent, an oil-soluble dye, a filler and the like.

When an injection solution is prepared by mixing a reaction catalyst, a mold release agent and other additives to the isocyanate compound and the active hydrogen compound, addition of the catalyst, the mold release agent and other additives is also dependent on the solubility into the isocyanate compound and the active hydrogen compound. However, the catalyst, the mold release agent and other additives may be added to the isocyanate compound in advance and dissolved therein, may be added to the active hydrogen compound and dissolved therein, or may be added to a mixture of the isocyanate compound and the active hydrogen compound and dissolved therein. Or, they may be dissolved in a part of the isocyanate compound or the active hydrogen compound in use to prepare a master solution, and then the solution may be added. The procedure of addition is not restricted to these exemplified methods, and properly selected depending on the operability, safety, convenience or the like.

Mixing is generally performed at a temperature of not more than 30 degrees centigrade. It is sometimes preferable to employ a further lower temperature in consideration of the pot life of the mixture. Furthermore, when the solubility of the additives such as a catalyst and a mold releasing agent into the isocyanate compound and the active hydrogen compound is poor, there may also be a case where the additives are dissolved in the isocyanate compound, the active hydrogen compound or their mixture by heating in advance.

Furthermore, depending on the requirement for physical properties of the resultant plastic lens, degassing treatment under vacuum or filtration treatment under pressure and vacuum and the like may be preferably performed in many cases.

Subsequently, after injection of a mixture of the isocyanate compound and the active hydrogen compound into a lens casting mold in which a polarized film is fixed, the lens casting mold is heated in a heating apparatus, such as an oven or under water according to a predetermined temperature program for curing and molding over several hours to several tens of hours.

The temperature of polymerization curing is not restricted because the conditions of curing are different depending on the composition of the mixture, the kind of the catalyst, the shape of the mold and other factors, but polymerization curing is conducted at a temperature of about −50 to 200 degrees centigrade over 1 to 100 hours.

Normally, it is a common practice to start in the temperature range of 5 to 40 degrees centigrade, to raise the temperature gradually to the range of 80 to 130 degrees centigrade, and to keep at that temperature for 1 to 4 hours.

After completion of curing and molding, a plastic lens can be obtained by taking out the lens from the lens casting mold.

It is preferable that the plastic lens obtained from the optical material of the present embodiment is subjected to an annealing treatment by heating the lens after releasing from the mold for the purpose of relaxation of strain caused by polymerization. The annealing temperature is usually in the range of 80 to 150 degrees centigrade, preferably in the range of 100 to 130 degrees centigrade and further preferably in the range of 110 to 130 degrees centigrade. The annealing time is usually in the range of 0.5 to 5 hours and preferably in the range of 1 to 4 hours.

The plastic lens obtained from the optical material of the present embodiment may be used by forming a coating layer on one side or both sides as necessary. Examples of the coating layer include a primer layer, a hard coat layer, an anti-reflection layer, an anti-fog coating layer, an anti-fouling layer, a water-repellent layer and the like. These coating layers may be used singly, or a plurality of coating layers may be used in multiple layers. When the coating layers are formed on both sides, the same coating layer or different coating layers may be formed on each side.

Known additives may be used to these coating layers together for the improvement in the performance of the lens. Concrete examples of the additive include an ultraviolet absorber for protecting lenses and eyes from ultraviolet rays; an infrared ray absorber for protecting eyes from infrared rays; a light stabilizer or an anti-oxidant for improving weather resistance of the lens; and a dye and a pigment for the purpose of enhancing fashionability of the lens. Further, a photochromic dye and a photochromic pigment, an anti-static agent or various other additives may be used. Furthermore, various leveling agents may be used for the purpose of improving applicability of coating.

The primer layer, in general, is formed between the lens substrate (the optical material obtained from the polymerizable composition of the present embodiment) and the hard coat layer for the purpose of enhancing adhesion of the hard coat layer and improving impact resistance of the plastic lens. The thickness of the layer is usually about from 0.1 to 10 μm.

The primer layer is formed, for example, by either a coating method or a drying method. When the coating method is employed, a primer layer is formed by applying the primer composition in a known coating method such as spin coating or dip coating onto the lens and then solidifying the resultant. When the drying method is employed, a primer layer is formed by a known drying method such as a CVD method or a vacuum vapor deposition method. In forming the primer layer, for the purpose of enhancing adhesion, the surface of the lens may be subjected to pre-treatment such as an alkaline treatment, a plasma treatment, an ultraviolet ray treatment and the like as necessary.

As the primer composition, any materials are preferably used as long as its adhesion of the solidified primer layer to the lens substrate (the optical material obtained from the polymerizable composition of the present embodiment) is high. There can be usually used a urethane based resin, an epoxy based resin, a polyester based resin, a melanin based resin, a primer composition having polyvinylacetal as a main component and the like. A proper solvent which does not affect the lens may be used for the primer composition for the purpose of adjusting the viscosity of the composition or the like. Of course, a solvent may not be used.

A hard coat layer is a coating layer for the purpose of providing the surface of the lens with functions such as scratch resistance, abrasion resistance, moisture resistance, hot water resistance, heat resistance, weather resistance and the like. The thickness of the layer is usually about from 0.3 to 30 μm.

The hard coat layer is usually formed by applying the hard coating composition in a known coating method such as spin coating or dip coating onto the lens and then curing. As the curing method, there can be exemplified thermal curing, radiation curing using irradiation of energy beams such as ultraviolet rays, visible rays or the like. In forming a hard coat layer, for the purpose of enhancing adhesion, the coated surface (the lens substrate or primer layer) may be subjected to pre-treatment such as an alkaline treatment, a plasma treatment, an ultraviolet ray treatment and the like as necessary.

As the hard coating composition, there are generally used a mixture of an organosilicon compound having curing properties and fine particles of oxides (including complex oxide fine particles) of Si, Al, Sn, Sb, Ta, Ce, La, Fe, Zn, W, Zr, In, Ti and the like in many cases. Furthermore, in addition to the above components, there may also be used amines, amino acids, complex of metal acetylacetonate, metal salts of organic acid, perchloric acids, salts of perchloric acid, acids, metal chlorides, polyfunctional epoxy compounds and the like. A proper solvent which does not affect the lens may be used for the hard coating composition. Of course, a solvent may be not be used.

An anti-reflection layer is usually formed on the hard coat layer as necessary. As the anti-reflection layer, there are inorganic-based and organic-based layers. In case of the inorganic-based layer, the layer is generally formed by a drying method such as vacuum vapor deposition, sputtering method, ion plating method, ion beam assisted deposition method, CVD method and the like, by using an inorganic oxide such as $SiO_2$, $TiO_2$ and the like in many cases. In case of the organic-based layer, in general, the layer is formed by a wet method using a composition containing an organosilicon compound and silica-based fine particles having internal pores in many cases.

The anti-reflection layer may be a single layer or a multiple layer. When it is used as a single layer, it is preferable that the refractive index of the anti-reflection layer is lower by at least 0.1 or more than that of the hard coat layer. Furthermore, in order to develop anti-reflection function effectively, a multiple anti-reflection layer is preferable. In that case, usually a low refractive index layer and a high refractive index layer are alternately laminated. In this case, it is also preferable that the difference in the refractive index of the low refractive index layer and that of the high refractive index layer is not less than 0.1. As the high refractive index layer, for example, layers of ZnO, $TiO_2$, $CeO_2$, $Sb_2O_5$, $SnO_2$, $ZrO_2$, $Ta_2O_5$ and the like are used, while as the low refractive index layer, layers of $SiO_2$ and the like are used. The film thickness is usually from about 50 to 150 nm.

In addition, the plastic lens obtained from the optical material of the present embodiment may be subjected to surface polishing, anti-static treatment, tinting process, photochromic process and the like as necessary.

Since such a plastic lens may be formed in a small thickness, it is useful as a lens for eyeglasses, particularly as the lens for correcting visual acuity.

EXAMPLES

Hereinafter, the present invention will be illustrated in more detail with reference to Examples. However, the present invention is not restricted to these Examples.

The property tests of the lens obtained by polymerization were conducted for its evaluation. Among properties of the obtained lens, the refractive index, Abbe's Number, heat resistance and strength were evaluated according to the following test methods.

Refractive index (ne) and Abbe's number (ve): These were measured at 20 degrees centigrade using KPR-30, a Pulfrich refractometer, manufactured by Shimadzu Corporation.

Heat resistance: The heat resistance was Tg measured by the TMA penetration method (a load of 50 g, a pinpoint of 0.5 mmφ) using TMA-60 manufactured by Shimadzu Corporation.

Specific gravity: It was measured at 20 degrees centigrade according to the Archimedian method.

Color: Using a colorimeter (CR-200 manufactured by Minolta Co., Ltd.), the yellowness index (YI) was measured by preparing a resin plate having a thickness of 9 mm.

Viscosity: The viscosity of the monomer mixture was measured with a B type viscometer at 20 degrees centigrade.

Light resistance test: A resin plate having a thickness of 2 mm was prepared and irradiated using a QUV testing machine for 48 hours, and then ΔYI was measured from the resin color before and after irradiation (Irradiation was performed under QUV test conditions of an irradiance of 0.35 W/m$^2$ and a black panel temperature of 50 degrees centigrade using UVB-340 as the light source.).

Example 1

34.65 g of tolylene diisocyanate and 14.34 g of hexamethylene diisocyanate were mixed and dissolved. 0.0075 g of dimethyltin dichloride as a curing catalyst, 0.05 g of Viosorb 583 as an ultraviolet absorber and 0.05 g of Zelec UN (acid phosphate ester: registered trademark, a product of Stepan Company) as an internal release agent were further added thereto, and the contents were mixed and dissolved at 20 degrees centigrade. After dissolution, 51.01 g of 4-mercaptomethyl-1,8-dimercapto-3,6-dithiaoctane was added thereto, and the contents were mixed and dissolved to give a uniform solution (in the solution, (NCO+NCS)/(SH+OH) =1.0/1.0). The viscosity of the uniform solution was 13 mPa·s. This uniform solution was degassed at 600 Pa for 1 hour, filtered using a 1 μm Teflon (registered trademark) filter, and then poured into a mold frame composed of a glass mold and a tape. This mold frame was put into an oven, subjected to a temperature elevation from 25 to 120 degrees centigrade slowly, and polymerized for about 24 hours. After the polymerization was completed, the mold frame was taken out from the oven, and released therefrom to obtain a resin. The obtained resin was further annealed at 120 degrees centigrade for 4 hours. For the obtained resin, the refractive index (ne) was 1.668, the Abbe's Number (ve) was 28, the heat resistance was 113 degrees centigrade, the YI value was 10.9, and the resin specific gravity was 1.35. Furthermore, ΔYI of the obtained resin in the light resistance test was 5.1.

Example 2

30.68 g of tolylene diisocyanate and 15.95 g of hexamethylene diisocyanate were mixed and dissolved. 0.005 g of dimethyltin dichloride as a curing catalyst, 0.05 g of Viosorb 583 as an ultraviolet absorber and 0.05 g of Zelec UN (acid phosphate ester: registered trademark, a product of Stepan Company) as an internal release agent were further added thereto, and the contents were mixed and dissolved at 20 degrees centigrade. After dissolution, 53.37 g of 4,8-, 4,7- or 5,7-dimercaptomethyl-1,11-dimercapto-3,6,9-trithiaundecane was added thereto, and the contents were mixed and dissolved to give a uniform solution (in the solution, (NCO+NCS)/(SH+OH)=1.0/1.0). The viscosity of the uniform solution was 21 mPa·s. This uniform solution was degassed at 600 Pa for 1 hour, filtered using a 1 μm Teflon (registered trademark) filter, and then poured into a mold frame composed of a glass mold and a tape. This mold frame was put into an oven, subjected to a temperature elevation from 25 to 120 degrees centigrade slowly, and polymerized for about 24 hours. After the polymerization was completed, the mold frame was taken out from the oven, and released therefrom to obtain a resin. The obtained resin was further annealed at 120 degrees centigrade for 4 hours. For the obtained resin, the refractive index (ne) was 1.669, the Abbe's Number (ve) was 29, the heat resistance was 125 degrees centigrade, the YI value was 10.5, and the resin specific gravity was 1.36. Furthermore, ΔYI of the obtained resin in the light resistance test was 5.4.

Example 3

16.50 g of tolylene diisocyanate and 29.50 g of hexamethylene diisocyanate were mixed and dissolved. 0.05 g of dimethyltin dichloride as a curing catalyst, 0.05 g of Viosorb 583 as an ultraviolet absorber and 0.10 g of Zelec UN (acid phosphate ester: registered trademark, a product of Stepan Company) as an internal release agent were further added thereto, and the contents were mixed and dissolved at 20 degrees centigrade. After dissolution, 54.00 g of a mixture containing 1,1,3,3-tetrakis(mercaptomethylthio)propane and 4,6-bis(mercaptomethylthio)-1,3-dithiane was added thereto, and the contents were mixed and dissolved to give a uniform solution (in the solution, (NCO+NCS)/(SH+OH)=1.0/1.0). The viscosity of the uniform solution was 25 mPa·s. This uniform solution was degassed at 600 Pa for 1 hour, filtered using a 1 μm Teflon (registered trademark) filter, and then poured into a mold frame composed of a glass mold and a tape. This mold frame was put into an oven, subjected to a temperature elevation from 25 to 120 degrees centigrade slowly, and polymerized for about 24 hours. After the polymerization was completed, the mold frame was taken out from the oven, and released therefrom to obtain a resin. The obtained resin was further annealed at 120 degrees centigrade for 4 hours. For the obtained resin, the refractive index (ne) was 1.671, the Abbe's Number (ve) was 29, the heat resistance was 104 degrees centigrade, the YI value was 5.5, and the resin specific gravity was 1.36. Furthermore, ΔYI of the obtained resin in the light resistance test was 4.5.

Comparative Example 1

40.56 g of 4,4'-diphenylmethane diisocyanate and 14.68 g of hexamethylene diisocyanate were mixed and dissolved. 0.0075 g of dimethyltin dichloride as a curing catalyst, 0.05 g of Viosorb 583 as an ultraviolet absorber and 0.05 g of Zelec UN (acid phosphate ester: registered trademark, a product of Stepan Company) as an internal release agent were further added thereto, and the contents were mixed and dissolved at 20 degrees centigrade. After dissolution, 44.76 g of 4-mercaptomethyl-1,8-dimercapto-3,6-dithiaoctane was added thereto, and the contents were mixed and dissolved to give a uniform solution (in the solution, (NCO+NCS)/(SH+OH)=1.0/1.0). The viscosity of the uniform solution was 23 mPa·s. This uniform solution was degassed at 600 Pa for 1 hour, filtered using a 1 μm Teflon (registered trademark) filter, and then poured into a mold frame composed of a glass mold and a tape. This mold frame was put into an oven, subjected to a temperature elevation from 25 to 120 degrees centigrade slowly, and polymerized for about 24 hours. After the polymerization was completed, the mold frame was taken out from the oven, and released therefrom to obtain a resin. The obtained resin was further annealed at 120 degrees centigrade for 4 hours. For the obtained resin, the refractive index (ne) was 1.674, the Abbe's Number (ve) was 26, the heat resistance was 112 degrees centigrade, the YI value was 9.0, and the resin specific gravity was 1.33. Furthermore, ΔYI of the obtained resin in the light resistance test was 24.9.

Comparative Example 2

36.24 g of 4,4'-diphenylmethane diisocyanate and 16.24 g of hexamethylene diisocyanate were mixed and dissolved. 0.005 g of dimethyltin dichloride as a curing catalyst, 0.05 g of Viosorb 583 as an ultraviolet absorber and 0.05 g of Zelec UN (acid phosphate ester: registered trademark, a product of Stepan Company) as an internal release agent were further added thereto, and the contents were mixed and dissolved at 20 degrees centigrade. After dissolution, 47.52 g of 4,8-, 4,7- or 5,7-dimercaptomethyl-1,11-dimercapto-3,6,9-trithiaundecane was added thereto, and the contents were mixed and dissolved to give a uniform solution (in the solution, (NCO+NCS)/(SH+OH)=1.0/1.0). The viscosity of the uniform solution was 33 mPa·s. This uniform solution was degassed at 600 Pa for 1 hour, filtered using a 1 μm Teflon (registered trademark) filter, and then poured into a mold frame composed of a glass mold and a tape. This mold frame was put into an oven, subjected to a temperature elevation from 25 to 120 degrees centigrade slowly, and polymerized for about 24 hours. After the polymerization was completed, the mold frame was taken out from the oven, and released therefrom to obtain a resin. The obtained resin was further annealed at 120 degrees centigrade for 4 hours. For the obtained resin, the refractive index (ne) was 1.674, the Abbe's Number (ve) was 27, the heat resistance was 125 degrees centigrade, the YI value was 7.3, and the resin specific gravity was 1.33. Furthermore, ΔYI of the obtained resin in the light resistance test was 23.1.

Comparative Example 3

34.64 g of tolylene diisocyanate and 22.85 g of hexamethylene diisocyanate trimer were mixed and dissolved. 0.0075 g of dimethyltin dichloride as a curing catalyst, 0.05 g of Viosorb 583 as an ultraviolet absorber and 0.20 g of Zelec UN (acid phosphate ester: registered trademark, a product of Stepan Company) as an internal release agent were further added thereto, and the contents were mixed and dissolved at 20 degrees centigrade. After dissolution, 42.51 g of 4-mercaptomethyl-1,8-dimercapto-3,6-dithiaoctane was added thereto, and the contents were mixed and dissolved to give a uniform solution (in the solution, (NCO+

NCS)/(SH+OH)=1.0/1.0). The viscosity of the uniform solution was 43 mPa·s. This uniform solution was degassed at 600 Pa for 1 hour, filtered using a 1 μm Teflon (registered trademark) filter, and then poured into a mold frame composed of a glass mold and a tape. This mold frame was put into an oven, subjected to a temperature elevation from 25 to 120 degrees centigrade slowly, and polymerized for about 24 hours. After the polymerization was completed, the mold frame was taken out from the oven, and released therefrom to obtain a resin. The obtained resin was further annealed at 120 degrees centigrade for 4 hours. For the obtained resin, the refractive index (ne) was 1.651, the Abbe's Number (ve) was 28, the heat resistance was 124 degrees centigrade, the YI value was 5.8, and the resin specific gravity was 1.34. Furthermore, ΔYI of the obtained resin in the light resistance test was 10.8.

Comparative Example 4

31.18 g of tolylene diisocyanate and 25.31 g of hexamethylene diisocyanate trimer were mixed and dissolved. 0.005 g of dimethyltin dichloride as a curing catalyst, 0.05 g of Viosorb 583 as an ultraviolet absorber and 0.20 g of Zelec UN (acid phosphate ester: registered trademark, a product of Stepan Company) as an internal release agent were further added thereto, and the contents were mixed and dissolved at 20 degrees centigrade. After dissolution, 43.51 g of 4,8-, 4,7- or 5,7-dimercaptomethyl-1,11-dimercapto-3,6,9-trithiaundecane was added thereto, and the contents were mixed and dissolved to give a uniform solution (in the solution, (NCO+NCS)/(SH+OH)=1.0/1.0). The viscosity of the uniform solution was 126 mPa·s. This uniform solution was degassed at 600 Pa for 1 hour, filtered using a 1 μm Teflon (registered trademark) filter, and then poured into a mold frame composed of a glass mold and a tape. This mold frame was put into an oven, subjected to a temperature elevation from 25 to 120 degrees centigrade slowly, and polymerized for about 24 hours. After the polymerization was completed, the mold frame was taken out from the oven, and released therefrom to obtain a resin. The obtained resin was further annealed at 120 degrees centigrade for 4 hours. For the obtained resin, the refractive index (ne) was 1.647, the Abbe's Number (ve) was 29, the heat resistance was 135 degrees centigrade, the YI value was 5.6, and the resin specific gravity was 1.34. Furthermore, ΔYI of the obtained resin in the light resistance test was 13.3.

Comparative Example 5

0.005 g of dimethyltin dichloride as a curing catalyst, 0.05 g of Viosorb 583 as an ultraviolet absorber and 0.05 g of Zelec UN (acid phosphate ester: registered trademark, a product of Stepan Company) as an internal release agent were added to 44.45 g of tolylene diisocyanate, and the contents were mixed and dissolved at 20 degrees centigrade. After dissolution, 22.91 g of pentaerythritol tetrakismercaptopropionate and 32.64 g of 4,8-, 4,7- or 5,7-dimercaptomethyl-1,11-dimercapto-3,6,9-trithiaundecane were added thereto, and the contents were mixed and dissolved to give a uniform solution (in the solution, (NCO+NCS)/(SH+OH) =1.0/1.0). The viscosity of the uniform solution was 40 mPa·s. This uniform solution was degassed at 600 Pa for 1 hour, filtered using a 1 μm Teflon (registered trademark) filter, and then poured into a mold frame composed of a glass mold and a tape. This mold frame was put into an oven, subjected to a temperature elevation from 25 to 120 degrees centigrade slowly, and polymerized for about 24 hours. After the polymerization was completed, the mold frame was taken out from the oven, and released therefrom to obtain a resin. The obtained resin was further annealed at 120 degrees centigrade for 4 hours. For the obtained resin, the refractive index (ne) was 1.659, the Abbe's Number (ve) was 27, the heat resistance was 138 degrees centigrade, the YI value was 11.0, and the resin specific gravity was 1.38. Furthermore, ΔYI of the obtained resin in the light resistance test was 8.9.

The above results are shown in Table 1. The viscosity of the mixed monomer in the Table is an index indicating handling properties upon mixing. In Examples 1 to 3, and Comparative Examples 1 and 2, the viscosities of the mixed monomers were low, thus exhibiting excellent handling properties. In particular, in Examples 1 to 3, color shifts (ΔYI) before and after light resistance test in the light resistance test were small in the Table, exhibiting excellent light resistance as well. In Comparative Examples 1 and 2, handling properties were excellent and initial colors were not much deteriorated either so that such monomers were practically useful. However, it was not sufficient for the requirement of light resistance. Tolylene diisocyanate and 4,4'-diphenylmethane diisocyanate with common structure as the same aromatic isocyanate exhibited different behavior in view of light resistance, and desirable effects were obtained from the system using tolylene diisocyanate as an essential component from the viewpoint of the effect of the present invention.

On the other hand, in Comparative Examples 3 to 5, the viscosities of the mixed monomers were high so that there was a problem in handling properties, and in Comparative Examples 3 and 4, color shifts (ΔYI) before and after light resistance test were high so that there was also a problem in light resistance. In particular, the system using tolylene diisocyanate and hexamethylene diisocyanate trimer used in Comparative Examples 3 and 4 corresponds to the system described in Example 4 of Patent Document 2 (Chinese Patent Laid-open No. 1405198). When a compound obtained by trimerizing hexamethylene diisocyanate was used for a raw material, the desired effects were not obtained.

TABLE 1

|  | Viscosity of mixed monomer [mPa · s] | Refractive Index [ne] | Abbe's Number [ve] |
| --- | --- | --- | --- |
| Example 1 | 13 | 1.668 | 28 |
| Example 2 | 21 | 1.669 | 29 |
| Example 3 | 25 | 1.671 | 29 |
| Comparative Example 1 | 23 | 1.674 | 26 |
| Comparative Example 2 | 33 | 1.674 | 27 |
| Comparative Example 3 | 43 | 1.651 | 28 |
| Comparative Example 4 | 126 | 1.647 | 29 |
| Comparative Example 5 | 40 | 1.659 | 27 |

|  | Heat Resistance [° C.] | Color [YI] | Specific Gravity | Light Resistance [ΔYI] |
| --- | --- | --- | --- | --- |
| Example 1 | 113 | 10.9 | 1.35 | 5.1 |
| Example 2 | 125 | 10.5 | 1.36 | 5.4 |
| Example 3 | 104 | 5.5 | 1.36 | 4.5 |
| Comparative Example 1 | 112 | 9.0 | 1.33 | 24.9 |

TABLE 1-continued

| | | | | |
|---|---|---|---|---|
| Comparative Example 2 | 125 | 7.3 | 1.33 | 23.1 |
| Comparative Example 3 | 124 | 5.8 | 1.34 | 10.8 |
| Comparative Example 4 | 135 | 5.6 | 1.34 | 13.3 |
| Comparative Example 5 | 138 | 11.0 | 1.38 | 8.9 |

The invention claimed is:

1. A polymerizable composition for an optical material comprising tolylene diisocyanate, hexamethylene diisocyanate, and one or more polythiol compounds selected from the group consisting of 4-mercaptomethyl-1,8-dimercapto-3,6-dithiaoctane, 4,8-, 4,7- or 5,7-dimercaptomethyl-1,11-dimercapto-3,6,9-trithiaundecane, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithietane, wherein the amount of tolylene diisocyanate is 35.9 wt % to 70.7 wt % and the amount of hexamethylene diisocyanate is 29.3 wt % to 64.1 wt % based on the total amount of isocyanate compounds in the composition.

2. The polymerizable composition for an optical material as set forth in claim 1, wherein the polythiol compound is 4-mercaptomethyl-1,8-dimercapto-3,6-dithiaoctane.

3. A method for producing an optical material, the method comprising the step of curing the polymerizable composition for an optical material as set forth in claim 1.

4. The method for producing an optical material as set forth in claim 3, in which said optical material is formed by cast polymerization of said polymerizable composition.

5. An optical material obtained by curing the polymerizable composition for an optical material as set forth in claim 1.

* * * * *